United States Patent
Park

(10) Patent No.: US 6,231,471 B1
(45) Date of Patent: May 15, 2001

(54) GEAR TRAIN FOR AN AUTOMATIC TRANSMISSION USED IN VEHICLES

(75) Inventor: Jong-Sool Park, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/465,799

(22) Filed: Dec. 17, 1999

(30) Foreign Application Priority Data

Jul. 8, 1999 (KR) ................................. 99-27508

(51) Int. Cl.$^7$ ....................................... F16H 3/66
(52) U.S. Cl. ............................................. 475/325
(58) Field of Search ........................ 475/269, 296, 475/323, 325, 331

(56) References Cited

FOREIGN PATENT DOCUMENTS

| | | |
|---|---|---|
| 2-150533 | * 6/1990 | (JP) . |
| 2-154846 | * 6/1990 | (JP) . |
| 4-29651 | * 1/1992 | (JP) . |
| 8-105498 | * 4/1996 | (JP) . |
| 11-166598 | * 6/1999 | (JP) . |

* cited by examiner

*Primary Examiner*—Charles A. Marmor
*Assistant Examiner*—Ankur Parekh
(74) *Attorney, Agent, or Firm*—Finnegan, Henderson, Farabow, Garrett & Dunner, LLP

(57) ABSTRACT

A gear train for an automatic transmission includes first, second and third planetary gear sets. The first planetary gear set includes a first element variably connected to an input shaft, a second element variably connected to the input shaft and the first element, and a third element connected to a transfer shaft to transmit power to the transfer shaft. The second planetary gear set includes a fourth element fixedly connected to the first element while being variably connected to the input shaft, a fifth element variably connected to the input shaft while being variably connected to a combination of the first and fourth elements, and a sixth element connected to the transfer shaft to transmit power to the transfer shaft. The third planetary gear set includes a seventh element fixedly connected to the combination of the first and fourth elements, an eighth element variably connected to the transmission housing, and a ninth element fixedly connected to the third element while being connected to the transfer shaft to transmit power thereto. A plurality of friction elements are provided to realize the variable connections.

9 Claims, 3 Drawing Sheets

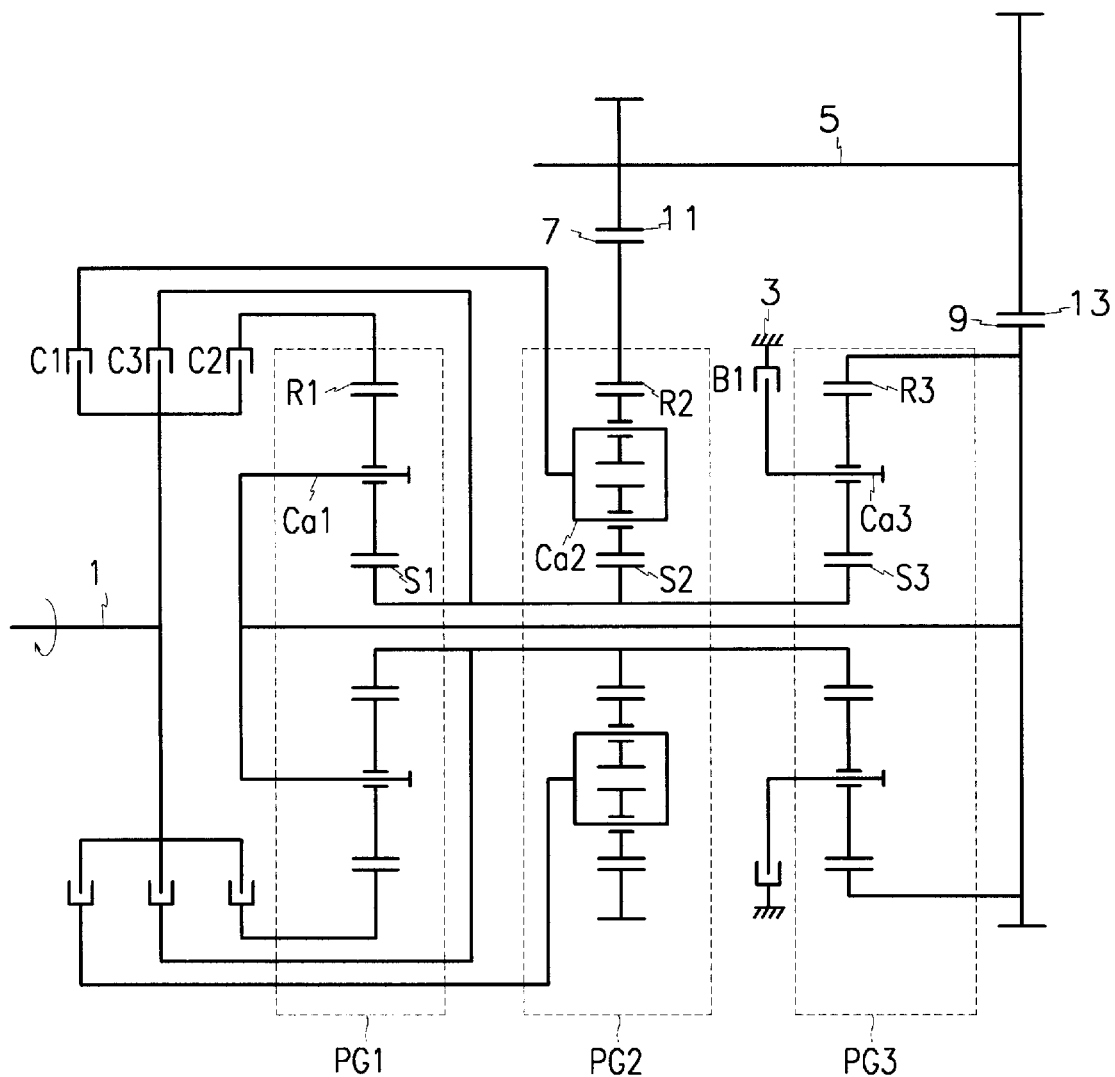

GEAR TRAIN FOR AN AUTOMATIC TRANSMISSION USED IN VEHICLES

BACKGROUND OF THE INVENTION (a) Field of the Invention

The present invention relates to a gear train for an automatic transmission used in vehicles. More particularly, the invention relates to a gear train for a 6-forward speed and 1-reverse speed automatic transmission.

(b) Description of the Related Art

Generally, automatic transmission systems for vehicles are provided with a transmission control unit ("TCU") which automatically controls shift ratios according to changes in a running condition of the vehicle.

The typical TCU controls a plurality of friction elements provided in a gear train to either operative or inoperative states to select one of the three essential elements of the planetary gear set (a sun gear, a ring gear and a planet carrier) to be an input element, one to be a reaction element, and one to be an output element, thereby controlling an output number of revolutions.

Particularly, a gear train that can realize a 5-forward speed and a 1-reverse speed comprises a plurality of heavy and large-sized clutches and brakes and a plurality of inoperative friction elements, resulting in deterioration of power and space efficiencies.

SUMMARY OF THE INVENTION

Therefore, the present invention has been made in an effort to solve the above problems.

It is an object of the present invention to provide a gear train for an automatic transmission, which is compact in size and light in weight, while providing improved power efficiency.

To achieve the above object, the present invention provides a gear train for an automatic transmission comprising a first planetary gear set comprising a first element variably connected to an input shaft, a second element variably connected to the input shaft and the first element, and a third element connected to a transfer shaft to transmit power to the transfer shaft; a second planetary gear set comprising a fourth element fixedly connected to the first element while being variably connected to the input shaft, a fifth element variably connected to the input shaft while being variably connected to a combination of the first and fourth elements, and a sixth element connected to the transfer shaft to transmit power to the transfer shaft; a third planetary gear set comprising a seventh element fixedly connected to the combination of the first and fourth elements, an eighth element variably connected to the transmission housing, and a ninth element fixedly connected to the third element while being connected to the transfer shaft to transmit power thereto; and friction means for realizing the variable connections.

Preferably, the first planetary gear set is a single pinion planetary gear set, the second planetary gear set is a double pinion planetary gear set, and the third planetary gear set is a single pinion planetary gear set.

Preferably, the first element is a first sun gear, the second element is a first ring gear, the third element is a first planet carrier, the fourth element is a second sun gear, the fifth element is a second planet carrier, the sixth element is a second ring gear, the seventh element is a third sun gear, the eighth element is a third planet carrier, and the ninth element is a third ring gear.

The friction means comprises a first clutch interposed between the input shaft and the second carrier, a second clutch interposed between the input shaft and the first planet carrier, a third clutch interposed between the input shaft and the combination of the first and second sun gears, a first brake interposed between the third planet carrier and the transmission housing.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a schematic diagram of a gear train for an automatic transmission according to a preferred embodiment of the present invention;

FIG. 2 is an operational chart of friction elements in each shift range according to a preferred embodiment of the present invention;

DETAILED DESCRIPTION OF THE PREFERRED EMBODIMENTS

Figure 3:
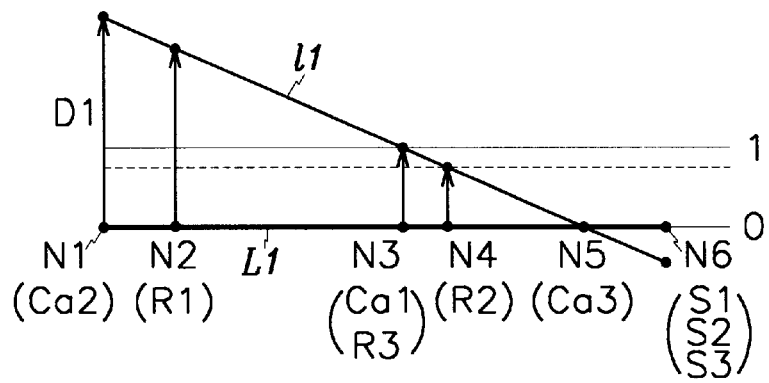
FIG. 3 is a view for illustrating shift ratio of a first speed in a drive "D" range according to a preferred embodiment of the present invention through a lever analogy method.
Figure 4:
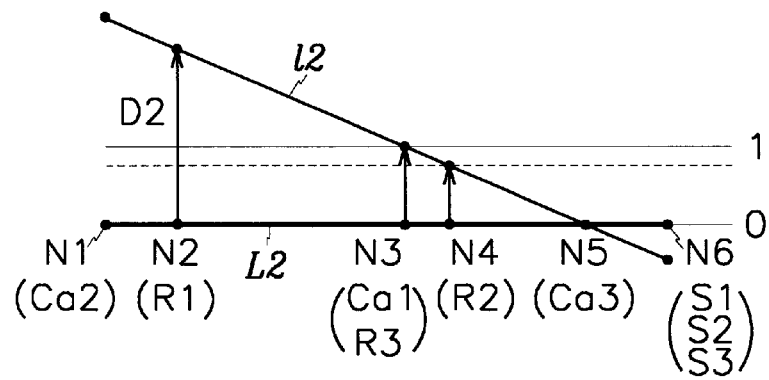
FIG. 4 is a view for illustrating a shift ratio of a second speed in a drive "D " range according to a preferred embodiment of the present invention through a lever analogy method.
Figure 5:
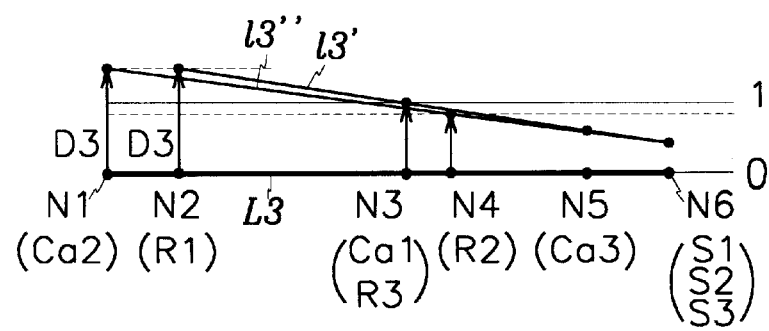
FIG. 5 is a view for illustrating a shift ratio of a third speed in a drive "D" range according to a preferred embodiment of the present invention through a lever analogy method.
Figure 6:
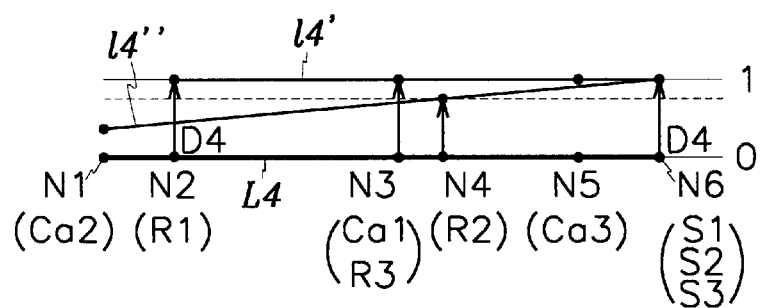
FIG. 6 is a view for illustrating a shift ratio of a fourth speed in a drive "D" range according to a preferred embodiment of the present invention through a lever analogy method.
Figure 7:
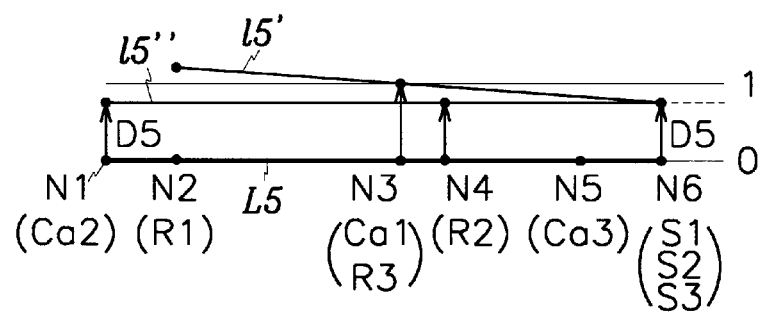
FIG. 7 is a view for illustrating a shift ratio of a fifth speed in a drive "D" range according to a preferred embodiment of the present invention through a lever analogy method.
Figure 8:
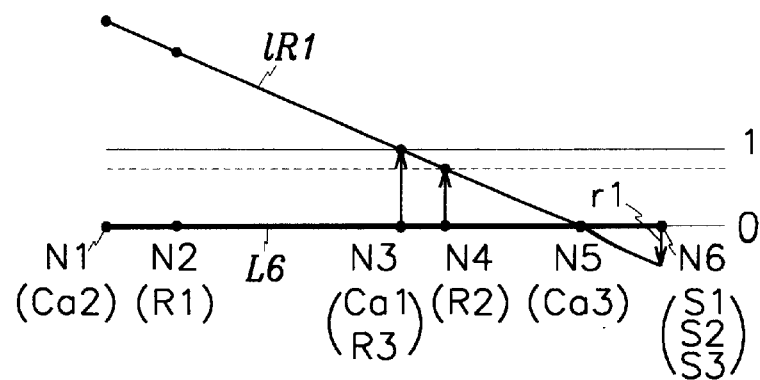
FIG. 8 is a view for illustrating a shift ratio of a reverse speed according to a preferred embodiment of the present invention through a lever analogy method.

A preferred embodiment of the present invention will now be described in detail with reference to the accompanying drawings.

FIG. 1 shows a schematic diagram of a gear train according to a preferred embodiment of the present invention.

The inventive gear train comprises first, second and third planetary gear sets PG1, PG2 and PG3. that are disposed around an input shaft 1. The first planetary gear set PG1 is a single pinion type, which comprises a sun gear S1 variably connected to the input shaft 1, a ring gear R1 variably connected to the input shaft 1, and a planet carrier Ca1 connected to a transfer shaft 5 to transmit power thereto. The sun gear S1 is also variably connected to the ring gear R1.

The second planetary gear set PG2 is a double pinion type, which comprises a sun gear S2 fixedly connected to the sun gear S1 of the first planetary gear set PG1 while being variably connected to the input shaft 1, a planet carrier Ca2 variably connected to the input shaft 1 while being variably connected to the combination of the sun gears S1 and S2, and a ring gear R2 connected to the transfer shaft 5 to transmit power thereto.

The third planetary gear set PG3 is a single pinion type, which comprises a sun gear S3 fixedly connected to the combination of the sun gears S1 and S2, a planet carrier Ca3 variably connected to the transmission housing 3, and a ring gear fixedly connected to the planet carrier Ca1 of the first planetary gear set PG1 while being connected to the transfer shaft 5 to transmit power thereto.

For the above described variable connection, a first clutch C1 is interposed between the input shaft 1 and the planet carrier Ca2 of the second planetary gear set PG2, a second clutch C2 is interposed between the input shaft 1 and the planet carrier Ca1, and a third clutch is interposed between the input shaft 1 and the combination of the sun gears S1 and S2 of the first and second planetary gear sets PG1 and PG2. In addition, a first brake B1 is interposed between the planet carrier Ca3 of the third planetary gear set PG3 and the transmission housing 3.

As a result of the above, through the selective operation of the first, second and third clutches C1, C2 and C3 and the first brake B1, 5-forward speed and 1-reverse speed are realized and transmitted to the transfer shaft 5. The selective operation of the friction elements is controlled by the TCU. First and second transfer drive gears 7 and 9 respectively fixed on the ring gear R2 of the second planetary gear set PG2 and the combination of the planet carrier Ca1 of the first planetary gear set PG1 and the ring gear R3 of the third planetary gear set PG3 are engaged with first and second transfer driven gears 11 and 13 of the transfer shaft 5, respectively.

That is, the friction elements are operated in each speed as shown in the friction elements operation chart of FIG. 2. The shift process will be explained hereinafter using the operation chart of FIG. 2 and the lever analogy diagrams of FIGS. 3, 4, 5, 6, 7 and 8, in which the first, second, and third planetary gear sets PG1, PG2 and PG3 are represented by first to sixth levers L1 to L6.

First to sixth nodes N1 to N6 located on each lever denotes each element of the first, second and third planetary gear sets PG1, PG2 and PG3. That is, the first node N1 denotes the planet carrier Ca2 of the second planetary gear set PG2, the second node N2 denotes the ring gear R1 of the first planetary gear set PG1, the third node N3 denotes the combination of the ring gear Ca1 of the first planetary gear set PG1 and the ring gear R3 of the third planetary gear set PG3, and the fourth node N4 indicates the ring gear R2 of the second planetary gear set PG2. The fifth node N5 indicates the planet carrier Ca3 of the third planetary gear set PG3 and the sixth node N6 denotes the combination of the sun gears S1, S2 and S3 of the first, second and third planetary gear sets PG1, PG2 and PG3.

FIRST-FORWARD SPEED

A speed ratio of the first-forward speed will be explained hereinafter with reference to FIG. 3.

In the first-forward speed, since the first clutch C1 and the first brake B1 are controlled to operate by the TCU as shown in FIG. 2, in the first lever L1 of FIG. 3, the third and fourth nodes N3 and N4 become the output elements, the fifth node N5 becomes the reacting element, and the first node N1 operates as the input element.

It is assumed that an output speed of the third node N3 is fixed at "1," and an output speed of the fourth node N4 is lower than the output speed "1" of the third node N3.

Accordingly, an extended line connecting the output speed "1,"outputted from the output node N3, to the reacting node N5 becomes a first-forward speed line I1.

Therefore, a line vertically connecting the input node N1 to the first speed line I1 becomes a first input speed line D1. The first input speed line D1 is higher than the output speed "1."

Accordingly, it is noted that an output number of rotations becomes much smaller than an input number of rotations, and a reduction in speed is realized through a first speed shift ratio.

SECOND-FORWARD SPEED

In the above first-forward speed state, if vehicle speed and throttle opening are increased, the TCU disengages the first clutch C1 and operates the second clutch C2 as shown in the operation chart of FIG. 2. Accordingly, in the second lever L2 shown in FIG. 4, the input element is changed from the first node N1 to the second node N2 while the third and fourth nodes N3 and N4 become the output elements and the fifth node N5 becomes the reacting element.

It is still assumed that an output speed of the third node N3 is fixed at "1," and an output speed of the fourth node N4 is lower than the output speed "1" of the third node N3.

Therefore, an extended line connecting the output speed, outputted from the fourth node N4, to the reacting node N5 becomes the second-forward speed line I2.

Accordingly, a line vertically connecting the input node N2 to the second-forward speed line I2 becomes the second input speed line D2.

The second input speed line D2 is higher than the output speed "1,"but lower than the first input speed line D1.

Accordingly, it is noted that an output number of rotations in the second speed becomes smaller than an input number of rotations, but higher than that in the first speed.

THIRD-FORWARD SPEED

In the above third speed state, if vehicle speed and throttle opening are increased, the TCU disengages the first brake B1, operating the first clutch C1. Accordingly, in the third lever L3 shown in FIG. 5, the third and fourth nodes N3 and N4 operate as the output elements, and the first and second node N1 and N2 become the input elements.

It is still assumed that an output speed of the third node N3 is fixed at "1," and an output speed of the fourth node N4 is lower than the output speed "1" of the third node N3.

It is further assumed that inputs speeds D3 of the first and second nodes N1 and N2 are higher than "1," but lower than that in the second speed.

Therefore, an extended line connecting the output speed "1," outputted from the output node N3, to the input speed of the node N2 becomes a first third-forward speed line 13' and an extended line connecting the output speed of the output node N4 to the input speed of the node N2 becomes a second third-forward speed line I3."

Accordingly, it can be noted that, in the third-forward speed, the planet carrier Ca3 of the fifth node N5 and the combination of the sun gears S1, S2 and S3 rotates at the lower speed that other elements.

FOURTH-FORWARD SPEED

In the above third speed state, if vehicle speed and throttle opening are increased, the TCU disengages the first clutch C1 and operates the third clutch C3. Accordingly, in the fourth lever L4 shown in FIG. 6, the third and fourth nodes N3 and N4 operate as the output elements, and the second and sixth nodes N2 and N6 become the input elements.

It is still assumed that an output speed of the third node N3 is fixed at "1," and an output speed of the fourth node N4 is lower than the output speed "1" of the third node N3.

It is further assumed that input speeds D4 of the second and sixth nodes N2 and N6 are the same as the output speed "1" of the output node N3. That is, in the fourth speed, an input number of rotations is the same as an output number of rotations.

Accordingly, an extended line connecting the output speed "1" of the output node N3 to the input speed of the second node N2 becomes a first fourth-forward speed line 14', and an extended line connecting the output speed of the output node N4 to the input speed of the sixth node N2 becomes a second fourth-forward speed line 14".

FIFTH-FORWARD SPEED

In the above fourth-forward speed state, if vehicle speed and throttle opening are increased, the TCU disengages the second clutch C and operates the first clutch C1. Accordingly, in the fifth lever L5 shown in FIG. 7, the third and fourth nodes N3 and N4 operate as the output elements, and the first and sixth nodes N1 and N6 become the input elements.

It is still assumed that an output speed of the third node N3 is fixed at "1," and an output speed of the fourth node N4 is lower than the output speed "1" of the third node N3.

It is further assumed that input speeds D5 of the second and sixth nodes N2 and N6 are the same as the output speed of the fourth speed. That is, in the sixth speed, an overdrive is achieved, in which an output number of rotations is higher than an input number of rotations.

Accordingly, an extended line connecting the output speed "1" of the output node N3 to the input speed of the input node N6 becomes a first fifth-forward speed line I5', and an extended line connecting the output speed of the output node N4 to the output speed of the input speed of the input node N1 becomes a second fifth-forward speed line 15".

REVERSE SPEED

If the driver changes the selector lever to a reverse R range, the TCU controls the third clutch C3 and the first brake B1 to operate as shown in FIG. 2. Accordingly, in the sixth lever L6 shown in FIG. 7, the third and fourth nodes N3 and N4 operate as the output elements, and the sixth node N6 operates as the input element. The fifth node N5 functions as the reacting element.

It is still assumed that an output speed of the third node N3 is fixed at "1," and an output speed of the fourth node N4 is lower than the output speed "1" of the third node N3.

Accordingly, an extended line connecting the output speed "1" of the output node N3 to the reacting node N5 becomes a reverse speed line IR1.

Therefore, a line vertically connecting the input node N6 to the reverse speed line IR1 becomes an actual reverse input speed line r1, realizing reverse shifting. That is, it can be noted that, the input of the reverse speed is opposite to the output.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A gear train for an automatic transmission, comprising:
   a first planetary gear set comprising a first element variably connected to an input shaft, a second element variably connected to the input shaft and the first element, and a third element connected to a transfer shaft to transmit power to the transfer shaft;
   a second planetary gear set comprising a fourth element fixedly connected to the first element while being variably connected to the input shaft,
   a fifth element variably connected to the input shaft while being variably connected to a combination of the first and fourth elements, and a sixth element connected to the transfer shaft to transmit power to the transfer shaft;
   a third planetary gear set comprising a seventh element fixedly connected to the combination of the first and fourth elements, an eighth element variably connected to the transmission housing, and a ninth element fixedly connected to the third element while being connected to the transfer shaft to transmit power thereto; and
   friction means for realizing the variable connections.

2. A gear train of claim 1 wherein the first planetary gear set is a single pinion planetary gear set.

3. A gear train of claim 2 wherein the first element is a sun gear, the second element is a ring gear, and the third element is a planet carrier.

4. A gear train of claim 1 wherein the second planetary gear set is a double pinion planetary gear set.

5. A gear train of claim 4 wherein the fourth element is a sun gear, the fifth element is a planet carrier, and the sixth element is a ring gear.

6. A gear train of claim 1 wherein the third planetary gear set is a single pinion planetary gear set.

7. A gear train of claim 6 wherein the seventh element is a sun gear, the eighth element is a planet carrier, and the ninth element is a ring gear.

8. A gear train of claim 1 wherein the first element is a first sun gear, the second element is a first ring gear, the third element is a first planet carrier, the fourth element is a second sun gear, the fifth element is a second planet carrier, the sixth element is a second ring gear, the seventh element is a third sun gear, the eighth element is a third planet carrier, and the ninth element is a third ring gear.

9. A gear train of claim 8 wherein the friction means comprises a first clutch interposed between the input shaft and the second carrier, a second clutch interposed between the input shaft and the first planet carrier, a third clutch interposed between the input shaft and the combination of the first and second sun gears, a first brake interposed between the third planet carrier and the transmission housing.

\* \* \* \* \*